(12) United States Patent
Baumgarten et al.

(10) Patent No.: US 12,358,523 B2
(45) Date of Patent: Jul. 15, 2025

(54) METHOD AND DEVICE FOR INVOLVEMENT-DEPENDENT DYNAMIC BLOCKING OF AN OPERATING APPARATUS

(71) Applicant: Volkswagen Aktiengesellschaft, Wolfsburg (DE)

(72) Inventors: Thorb Baumgarten, Wolfsburg (DE); Alice Gross, Berlin (DE); Thomas Werner, Penzlin (DE); Eric Haller, Fredersdorf (DE); Julia Kohl, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 228 days.

(21) Appl. No.: 18/249,462

(22) PCT Filed: Nov. 2, 2021

(86) PCT No.: PCT/EP2021/080348
§ 371 (c)(1),
(2) Date: Apr. 18, 2023

(87) PCT Pub. No.: WO2022/122253
PCT Pub. Date: Jun. 16, 2022

(65) Prior Publication Data
US 2023/0391354 A1 Dec. 7, 2023

(30) Foreign Application Priority Data
Dec. 8, 2020 (DE) .................... 10 2020 215 460.0

(51) Int. Cl.
*B60W 50/16* (2020.01)
*B60W 40/08* (2012.01)

(52) U.S. Cl.
CPC ............ *B60W 50/16* (2013.01); *B60W 40/08* (2013.01); *B60W 2540/215* (2020.02)

(58) Field of Classification Search
CPC ................ B60W 50/16; B60W 40/08; B60W 2540/215; B60K 2360/111;
(Continued)

(56) References Cited

U.S. PATENT DOCUMENTS

| 6,892,116 B2 | 5/2005 | Geisler et al. .................... 701/1 |
| 9,123,215 B2 | 9/2015 | Kiefer et al. |

(Continued)

FOREIGN PATENT DOCUMENTS

| DE | 102011080624 A1 | 2/2012 |
| DE | 102013211721 A1 | 12/2013 |

(Continued)

OTHER PUBLICATIONS

International Search Report and Written Opinion, Application No. PCT/EP2021/080348, 16 pages, Jan. 26, 2022.
(Continued)

*Primary Examiner* — Mary Cheung
(74) *Attorney, Agent, or Firm* — Slayden Grubert Beard PLLC (57) ABSTRACT

The disclosure relates to a device for blocking display and/or operating contexts comprising at least one operating apparatus for detecting user interactions, and an evaluation apparatus, configured to determine a current involvement value at least on the basis of the detected user interactions. The evaluation apparatus is configured to compare the current involvement value with at least one interruption threshold value and to establish a blocking state if the current involvement value reaches the interruption threshold value. The evaluation apparatus blocks or at least restricts at least one operating context of the at least one operating
(Continued)

apparatus. The current involvement value is increased for each detected haptic user interaction, insofar as the current involvement value has not reached or exceeded the at least one interruption threshold value and the evaluation apparatus is configured to lower, continuously or in increments of time, the current involvement value by a recovery value.

15 Claims, 7 Drawing Sheets

(58) Field of Classification Search
CPC ........ B60K 2360/133; B60K 2360/197; B60K 35/10; B60K 35/29; G06F 3/0304; G06F 3/038; G06F 3/0416; G06F 3/0481; G06F 3/0488
See application file for complete search history.

(56) References Cited

U.S. PATENT DOCUMENTS

| | | | |
|---|---|---|---|
| 9,475,389 B1* | 10/2016 | Fung | B60K 35/10 |
| 9,845,097 B2 | 12/2017 | Prakah-Asante et al. | |
| 10,496,273 B2 | 12/2019 | Li et al. | |
| 11,178,272 B2* | 11/2021 | Breaux | H04M 1/72454 |
| 11,518,241 B2 | 12/2022 | Schunder et al. | |
| 2005/0038573 A1 | 2/2005 | Goudy | 701/1 |
| 2012/0041633 A1* | 2/2012 | Schunder | B60K 35/26 701/29.2 |
| 2013/0342339 A1* | 12/2013 | Kiefer | G08B 6/00 340/438 |
| 2014/0214313 A1 | 7/2014 | Lorenz | 701/301 |
| 2017/0017392 A1* | 1/2017 | Castaneda | G06F 3/02 |
| 2020/0094678 A1 | 3/2020 | Gaffar | |

FOREIGN PATENT DOCUMENTS

| | | |
|---|---|---|
| DE | 102018129801 A1 | 5/2020 |
| DE | 102020215460 A1 | 6/2022 |
| WO | 2022/122253 A1 | 6/2022 |

OTHER PUBLICATIONS

German Office Action, Application No. 102020215460.0, 7 pages, Feb. 22, 2023.

* cited by examiner

METHOD AND DEVICE FOR INVOLVEMENT-DEPENDENT DYNAMIC BLOCKING OF AN OPERATING APPARATUS

CROSS-REFERENCE TO RELATED APPLICATIONS

This application claims priority to German Patent Application No. DE 10 2020 215 460.0, filed on Dec. 8, 2020 with the German Patent and Trademark Office. The contents of the aforesaid Patent Application are incorporated herein for all purposes.

TECHNICAL FIELD

The invention relates to a method and a device for blocking display and/or operating contexts in a vehicle due to excessive distraction of the driver from the driving process.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles have numerous assistance and comfort systems whose functions sometimes require multi-step operation. It has been shown that, in doing so, there is a risk that the driver will be distracted too long from the driving process when operating complex functionalities that require a large number of operating steps, and safe driving by the driver is therefore not always ensured. In particular, complex multistep input actions often require removing one's gaze from the traffic situation.

Moreover, individual comfort content, for example displaying television or video images, are basically blocked while driving since looking at them is associated with a diversion from the traffic situation, which is unacceptable.

It is known in principle to block certain functions in vehicles that require multi-step operations such as, for example, entering an address by selecting letters of a street name for a navigation destination. This, however, leads to unsatisfactory restrictions and does not allow for adequately addressing operating situations in which, for example, several functions are operated in chronological order or are subsequently integrated into vehicle components.

SUMMARY

A need exists to provide an improved device and improved method that provide flexibility while operating and simultaneously provide a high level of safety when the driver is driving the vehicle.

The need is addressed by the subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein are based on the idea of not fundamentally blocking the functions and functionalities from the beginning, but rather performing the blocking dynamically during the use of the at least one operating apparatus depending on the actual user interaction. This allows blocking of the at least one operating apparatus to occur independent of the specific function that is to be operated, or also of an operation of a sequence of different functions, when it is anticipated that the driver will be overly distracted from the driving process, and an operation of functions is permitted that, in the specific case, only require a small number of operating steps that a driver can perform during an appropriate period and with an appropriate number of operating steps and operating complexity without this being unacceptable with regard to driving the vehicle in terms of driving safety.

In particular, a device is proposed for a vehicle for blocking display and/or operating contexts comprising:

at least one operating apparatus for detecting, in particular haptic, user interactions, and an evaluation apparatus which is designed to determine a current involvement value at least on the basis of the detected user interactions, wherein the evaluation apparatus is designed to compare the current involvement value with at least one interruption threshold value, and to establish a blocking state if the current involvement value reaches or exceeds the at least one interruption threshold value, and the evaluation apparatus blocks or at least restricts at least one operating context of the at least one operating apparatus, wherein the current involvement value is increased for each detected, in particular haptic, user interaction, insofar as the current involvement value has not reached or exceeded the at least one interruption threshold value, wherein the evaluation apparatus is designed to lower, continuously or in increments of time, the current involvement value by a recovery value.

Furthermore, a method is proposed for blocking display and/or operating contexts in a vehicle that comprises the method steps: detecting, in particular haptic, user interactions by means of at least one operating apparatus, and determining a current involvement value using at least the detected user interactions, wherein the current involvement value is compared with at least one interruption threshold value, and a blocking state is established if the current involvement value reaches or exceeds the at least one interruption threshold value, and at least one operating context of the at least one operating apparatus is blocked or at least restricted from further operation, wherein the current involvement value is increased for each detected, in particular haptic, user interaction, insofar as the current involvement value has not reached or exceeded the at least one interruption threshold value, and the current involvement value is lowered by a recovery value continuously or in increments of time.

The teachings herein offer the benefit that a blocking state is brought about dynamically depending on the involvement value, i.e., the involvement of the driver in an operation, by restricting or completely blocking additional operation of the at least one operating apparatus. Restriction of operation is required when certain functionalities that are needed for safely driving the vehicle are to remain operable. Otherwise, overall operation with the at least one operating apparatus is generally blocked once the blocking state is reached.

To ensure, for example, that no further operation is performed for a minimum period of time, in some embodiments, the operation of the at least one operating apparatus is only again permitted if the current involvement value has dropped to or below a release threshold value. This occurs as a result of the continuous reduction of the current involvement value over time.

In principle, the following holds true for all decisions in the present description in which a distinction is made between two states are conditional requirements depending on achieving or exceeding, or, respectively, achieving or falling below a value: the achievement of the value can be assigned to either one or the other state, or, respectively, one of the other conditional requirement. This is not at all decisive. It is only important that the achievement of the value is assigned to one state or one conditional requirement. Accordingly, there can only be a change to the blocking state if the current involvement value exceeds the interruption threshold value. Correspondingly in embodiments, the blocking state is for example only terminated if the current involvement value falls below the release threshold value.

In some embodiments, the evaluation apparatus is therefore designed to terminate the blocking state if the current involvement value falls below a release threshold value, or alternatively reaches or falls below the release threshold value.

In order for the involvement value to most clearly reflect the involvement of the driver in the user interaction and represent a good indicator of the distraction from driving the vehicle, it has proven to be beneficial to evaluate the different user interactions using very simple criteria for the involvement value.

It has proven beneficial to evaluate the spatial distance of the positions at which the user interactions are carried out in immediate succession over time, in particular are started, and the time intervals between these user interactions, in particular between the starts of these user interactions. Some embodiments provide that the at least one operating apparatus is designed to detect the user interaction resolved for position and time, and the evaluation apparatus is designed to increase the current involvement value depending on the spatial distance between positions and a time interval of sequential user interactions.

Position-dependent detection means that the position at which the user makes the entry is detected. In one operating apparatus with a keypad, this is for example the position of the key pressed during actuation. In one operating apparatus that for example is designed as a touchscreen, this is the position of touch at which the user interaction is started.

Time-resolved detection means that, in a user interaction, in addition to the position, the point in time is detected at which the user interaction was made, or at least a time interval from a previous actuation is detected. This does not have to be time in terms of the time of day; instead, the time can be determined using a cycle. For example, the value of a count register driven by an oscillating signal can be used, or the clock cycles between two start times of user interactions can be counted. In addition, a length of user interaction or a length of actuation can also be determined when detecting.

However, in order to not obtain an overly complex evaluation of the user interactions, it is for example provided that all user interactions that are not carried out in close proximity of the user interaction directly preceding in time and in a short time interval to the preceding user interaction are uniformly considered and evaluated as distance user interactions. These are distinguished from user interactions that are executed sequentially in a temporal and spatial context. For example, when a control element is actuated twice or when the same location on a touchscreen is touched twice, the second user interaction is always less involved than the first user interaction or an individual user interaction carried out at a temporal and spatial distance from the previous user interaction. Some embodiments provide that the evaluation apparatus is designed to increase the current involvement value upon each detection of an actuation start by a constant distance actuation value when the spatial distance of the position at which the actuation start of the user interaction is detected from the position at which the actuation start of the temporally preceding detected user interaction is detected reaches or exceeds a proximity threshold value, or when a time span between the detection of the actuation start and the detection of an actuation start directly preceding in time reaches or exceeds a local actuation time span, and to increase the current involvement value by a constant local actuation value upon each detected actuation start, when the spatial distance of the position at which the actuation start of the user interaction is detected from the position at which the actuation start of the temporally preceding detected user interaction is detected falls below a proximity threshold value, and in addition, a time span between the detection of the actuation start and the detection of the temporally immediately preceding actuation start falls below a local actuation time span, wherein the local actuation value is a smaller amount than the distance actuation value.

In principle, each user interaction is therefore evaluated the same. However, individual interactions are rated slightly lower whose actuation positions lie within the proximity of a user interaction directly proceeding in time and additionally occurring in short succession to an immediately temporally preceding user interaction since such a double or multiple actuation distracts a user less than two or more actuations in which the actuation element, in particular a finger, must be repositioned by the user.

An actuation duration of a user interaction also has an influence on how much a driver is distracted from the driving process. This holds true in particular when a duration of the user interaction meets a threshold value, which is described as a brief actuation threshold value here. This brief actuation threshold value is correlated with a brief actuation time span. Some embodiments provide that the evaluation apparatus is designed to increase the current involvement value by an actuation duration involvement value upon detecting an actuation end of the user interaction when an actuation duration of the user interaction has reached or exceeded a brief actuation threshold value.

In principle, user interactions that last longer than, for example, a short touch of a few 100 milliseconds or, in some embodiments, last longer than 1 second are rated interactions that indicate a higher involvement level by the user during the user interaction.

Some embodiments provide that the actuation duration involvement value is variable and is for example the same as a minimum of, on the one hand, a product of a difference between the actuation duration and the brief actuation time span, and an actuation duration weighting factor, and on the other hand an actuation duration involvement maximum value.

User interactions that have a longer actuation duration are therefore registered as more distracting actuations and user interactions, but very long lasting actuations are not overvalued.

However, it has been shown that in addition to the pure number of actuations as well as the positions of the actuations or the distances between the actuation locations and the duration of actuation, the temporal sequence of user interactions also provides information that is characteristic of certain distractions of the driver. Therefore, some embodiments provide that the evaluation apparatus has at least one state machine which evaluates an interaction sequence of the user interactions and is designed to recognize an increased involvement state or a normal involvement state based on the evaluation of the user interaction sequence, wherein the evaluation apparatus is designed to set the current involvement value to or above the interruption threshold value when the increased involvement state is recognized.

Such a state machine can therefore switch between a normal involvement state and an increased involvement state, wherein the increased involvement state causes the current involvement value to be raised enough for it to reach or exceed the interruption threshold value, which causes the blocking state of the device to be triggered.

In some embodiments, the user interactions within an interaction sequence are investigated as to whether the temporally sequential interactions are longer than an interaction monitoring time span. Furthermore, it is evaluated whether the time differences between the temporally sequential starts of the detected user interactions are shorter than an interaction interval time span. If a group of actuation starts is found in the user interaction sequence that meets these two criteria, the state machine to which are assigned the corresponding interaction monitoring time span and the interaction interval time span switches to the increased involvement state. Some embodiments therefore provide that the at least one state machine is assigned an interaction monitoring time span and an interaction interval time span, and changes to the increased involvement state upon detection of a user interaction sequence that comprises a group of actuation starts detected sequentially over time, in which the time intervals between the actuation starts of the group detected in direct sequence are all shorter than (or equal to) the interaction interval time span, and at the same time these actuation starts of the group in the user interaction sequence span a time period which is greater than or equal to the interaction monitoring time span.

Moreover, it has been demonstrated that involvement by the driver in operating the at least one operating apparatus in different user interaction sequences can be high enough for it not to be conducive to safely driving the vehicle. Some embodiments therefore provide that there is at least one additional state machine beyond the at least one state machine.

Some embodiments provide that, beyond the at least one state machine, the evaluation apparatus comprises at least one additional state machine which evaluates the user interaction sequence and which is designed to also detect an increased involvement state or a normal involvement state, and the evaluation apparatus sets the current involvement value to or above the interruption threshold value when the at least one additional state machine changes to the increased involvement state, wherein the at least one additional state machine is assigned an additional interaction monitoring time span and an additional interaction interval time span, and changes to the increased involvement state when a user interaction sequence is detected, which comprises an additional group of temporally sequential detected actuation starts in which the time intervals between the actuation starts of the additional group detected in direct sequence are all shorter than (or equal to) the additional interaction interval time span, and at the same time these actuation starts of the additional group in the user interaction sequence span a time period which is greater than or equal to the additional interaction monitoring time span.

Contrastingly in some embodiments, the one state machine reacts to interaction sequences that have actuation starts at a short time interval which last longer than the interaction monitoring time span assigned to the at least one state machine, and where the time intervals between the individual interaction starts are all shorter than the interaction interval time span that are assigned to the at least one state machine. In contrast, the at least one additional state machine establishes a high level of involvement by the driver in the operation if, over a longer time period spanning the additional interaction monitoring time span, there are repeated user interactions whose actuation starts are spaced apart from each other by a shorter time than the additional interaction interval time span. In this case, the additional interaction monitoring time span is longer than the interaction monitoring time span, and the additional interaction interval time span is greater than the interaction interval time span that is assigned to the at least one state machine. These continuous actuations that are, however, at greater intervals and over a longer time period without an interruption in actuation that is longer than the additional interaction interval time span, detect, for example, user interaction sequences in which several functions or vehicle apparatuses requiring one or more operating steps are operated sequentially. This can prevent a driver from attempting to avoid the blocking state in that he performs a very large number of user interactions in very short sequence, and such operations can also be prevented in which the at least one operating apparatus is intentionally used slowly but continuously. Both operating strategies cause the blocking state to be triggered because one of the two state machines changes to the elevated involvement state, either the at least one state machine or the at least one additional state machine, since the current involvement value is always set to or above the interruption threshold value when one of the state machines assumes the increased involvement state.

The operation or user interactions that a user can perform without this negatively affecting the driving of the vehicle does not, however, solely depend on the number of undertaken user interactions or the temporal sequence of these user interactions. Instead, other factors have an influence on which user interactions can be considered safe and/or harmless. These factors comprise for example a state of the driver himself, for example his tension and fatigue, but also factors such as environmental conditions, for example traffic volume or simply the driving situation in which the vehicle is currently located. Increased awareness is accordingly necessary to, for example, drive the vehicle in inner-city traffic. In comparison, in a driving situation where, for example, driving is at a constant speed on a highway, the stress on the driver from driving the vehicle is less. Other factors can, for example, be states of driver assistance systems. If, for example, lane detection assistance is active and operated at a high confidence level for detecting lane markings, less attention by the vehicle driver is required than, for example, when driving through a construction zone in which vehicle markings cannot be detected by the assistance system with the same confidence level.

All information factors that influence stress on the driver, whether by the driver himself, the vehicle, or the environment with the exception of the user interaction with the at least one operating apparatus is subsumed here under the term stress information.

For this reason, some embodiments provide taking into account stress information by dynamically adapting the interruption threshold value. Some embodiments therefore provide designing the evaluation apparatus to receive stress information and dynamically adapt the interruption threshold value based on the stress information.

In some embodiments, the evaluation apparatus comprises a strictness module that is designed to evaluate stress information and dynamically adapt the interruption threshold value based on this evaluation.

Correspondingly, the release threshold value may also be for example adapted dynamically depending on the stress information. Some embodiments therefore provide designing the evaluation apparatus to dynamically adapt the release threshold value depending on the stress information.

Whereas the interruption threshold value is lowered in the dynamic adaptation when major attention is required for driving the vehicle, the interruption threshold value can correspondingly be raised when less attention is required to drive the vehicle since, for example assistance systems are helping the driver drive the vehicle, and/or for example the driving situation does not represent major stress for the driver because of a low traffic volume.

In some embodiments, the release threshold value is not adapted. In other embodiments, the release threshold value is lowered for the instance in which major attention is needed to drive the vehicle, and is correspondingly raised when the driving situation does not require as much attention by the driver to drive the vehicle.

In some embodiments, the release threshold value can be lowered by a greater amount than the interruption threshold value when driving the vehicle requires greater attention by the driver. This extends the forced operating pause in comparison to a "normal state" that occurs over the duration of the blocking state.

For example, it is provided to inform the driver of the occurrence of the blocking state. Some embodiments therefore provide that the evaluation apparatus is coupled to at least one output apparatus in order to output blocking information about the existing blocking state that is perceptible without removing one's gaze from the road traffic.

The output can occur in various modalities, for example visually, and/or acoustically, and/or haptically.

In some embodiments, the output apparatus comprises a lighting apparatus, for example with a plurality of lighting means, wherein the lighting apparatus, for example the plurality of lighting means, is arranged or can be arranged on the edge of a windshield in the peripheral field of vision of the driver. If the lighting apparatus comprises, for example, a plurality of lighting means, the lighting means can comprise LEDs that are either multicolored and/or differently colored, and can be controlled individually or in groups to display the blocking state.

To prevent the driver from being surprised by the blocking state, it is beneficial to provide one or more warning levels that inform a driver during the user interaction that the current involvement value is approaching the interruption threshold value.

Some embodiments therefore provide that the evaluation apparatus comprises a warning apparatus which compares the current involvement value with at least one warning threshold value and outputs at least one warning about a pending blocking state via the at least one output apparatus, and/or the operating apparatus, and/or a display apparatus if the current involvement value falls below or reaches the at least one warning threshold value. If, for example, a plurality of warning thresholds are provided, a warning threshold value is provided for each of the warning thresholds. For example, these are defined relative to the interruption threshold value so that the warning threshold values are correspondingly adapted when there is a dynamic adaptation of the interruption threshold value. Other embodiments can, however, provide that the warning threshold values are assigned to fixed values, and then the corresponding warning state is always triggered when the warning threshold value assigned to the warning state is exceeded or reached by the current involvement value. If a plurality of warning thresholds exists and the current involvement value exceeds a plurality of these warning threshold values, the warning state is therefore active to which the warning threshold value is assigned that has the shortest distance from the interruption threshold value.

It is particularly beneficial to inform the driver via the output apparatus of the occurrence of a warning state. For example, in some embodiments in which the output apparatus has a plurality of lighting means in the peripheral field of view of the driver, the lighting means can be controlled so that light of a certain color is emitted which is linked to the warning state. A color is then for example also correspondingly assigned to the blocking state. For example, the color yellow is assigned to a first warning state, the color orange to a second warning state, and the color red to the blocking state. Of course, only one warning level or more than two warning levels can also be provided.

In order to inform the driver that the blocking state has ended, information is also for example output to the driver via the output apparatus. This can for example be done by an acoustic signal. This can also be done visually, for example by the plurality of lighting means that are turned off in a normal operating state. To communicate to the driver that the current involvement value is decreasing continuously or in steps during the blocking state, some embodiments provides that the number of lighting means emitting light to indicate the blocking state is reduced when the current involvement value decreases. For example, there is a proportionality here between the current involvement value and the number of light-emitting lighting means.

If the at least one operating apparatus has a display in the form of a freely programmable screen or display, the blocking state is for example also displayed by symbols and/or alphanumeric characters for the user. In particular, a static display appears that only indicates the blocking state so that the user is motivated to turn his gaze and attention to the driving process.

It goes without saying that, for a person skilled in the art, there can be certain functionalities that are operated using the at least one operating apparatus that, because of their major importance for driving safety, are not restricted or blocked by the blocking state. This holds true, for example, for a rear view camera whose video image of the rear traffic area of the vehicle is displayed on a display apparatus of the at least one operating apparatus even in the blocking state.

If the at least one operating apparatus has control elements that cannot be operated by a driver while driving the vehicle, or an interface by means of which remote control via operating apparatuses is possible that are not within the reach of the driver, user interactions detected thereby are not considered to increasing the current involvement value. If however, for example, a touchscreen of the at least one user apparatus is arranged in a center console between the driver and the passenger, user interactions by the driver and the passenger are registered and, if driver/passenger recognition is not possible, all are used to change the current involvement value.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Figure 1:
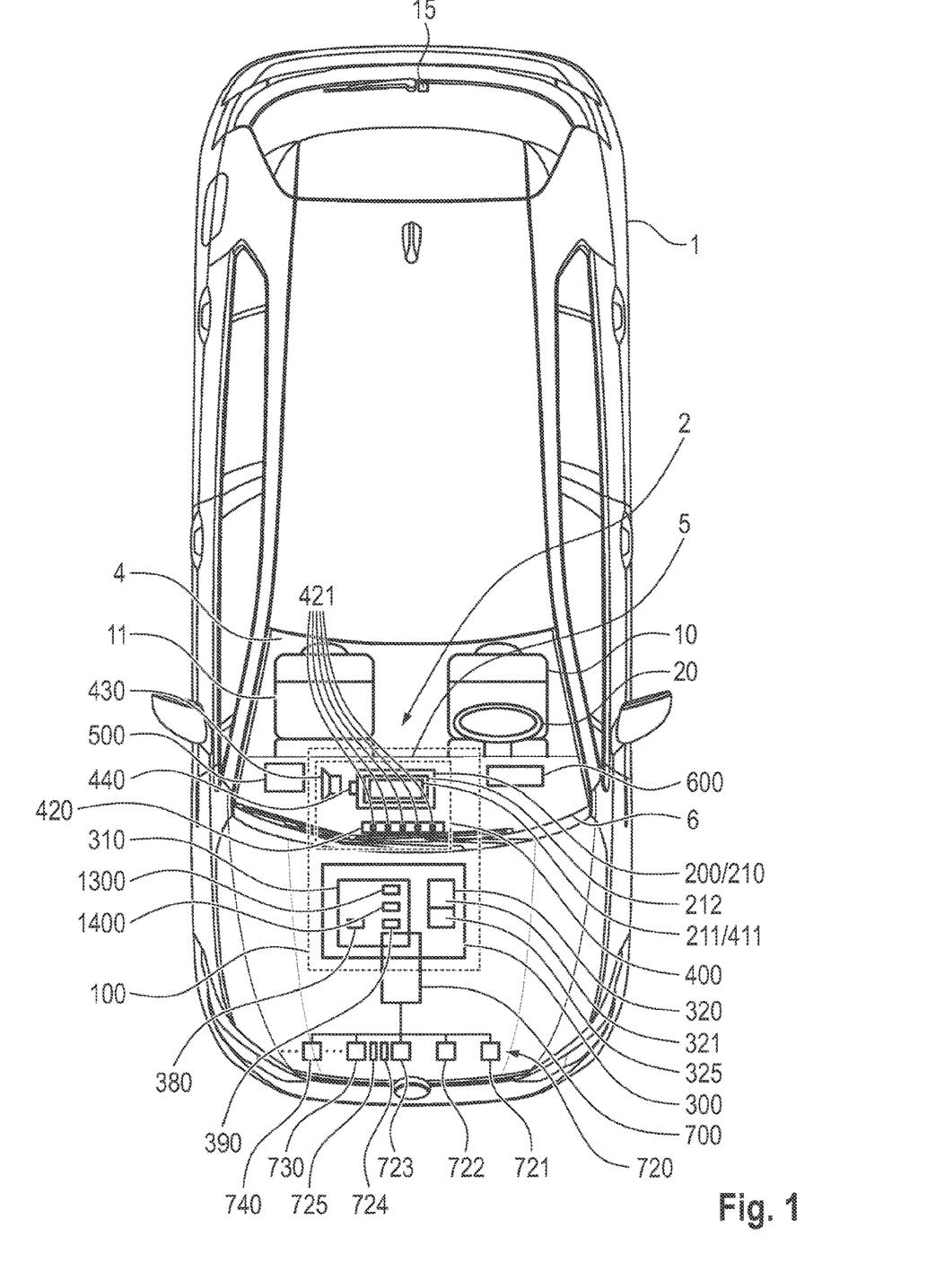
FIG. 1 shows a schematic representation of an example vehicle with a device for the involvement-dependent dynamic blocking of an operating apparatus.

FIG. 1 schematically shows a motor vehicle 1. This comprises a device 100 for blocking at least one operating apparatus 200. This operating apparatus 200 is for example arranged as a touchscreen 210 in a cockpit 2, for example in a center console between a driver's seat 10 and a passenger's seat 11. The touchscreen 210 possesses a display apparatus 211 that is coupled to a position detection unit 212. By means of the at least one operating apparatus 200 that, in addition to the touchscreen 210, can comprise other operating units which are not shown here, a wide variety of vehicle systems and functions can be operated. To do this, a user touches the touchscreen 210 with an actuation element such as a finger. In different display and operating contexts, different visual information can be shown on the display apparatus 211. For example, virtual control elements in the form of buttons, sliders, etc. can be shown. If a user touches the touchscreen 210 in the region of the display surface of a control element, this user interaction is detected as an actuation of the control element.

To perform user interactions on the at least one operating apparatus 200, the driver must generally avert his gaze at least temporarily from the driving process in order to orient himself. It is therefore problematic for driving safety when operating a vehicle system or a vehicle function requires numerous user interactions. It is also problematic when a driver as a user operates several vehicle functions or systems in quick succession. The device 100 therefore has an evaluation apparatus 300 to block the at least one operating apparatus 200. Said evaluation apparatus 300 receives the information about the user interactions detected by the at least one operating apparatus 210 and evaluates it.

The at least one operating apparatus is designed to detect the user interactions resolved for position and time. When talking here about the evaluation of the user interactions detected in a position and time resolved manner, the evaluation of the information about the user interactions detected by means of the at least one operating apparatus is always meant. The terms user interaction or actuation, etc. are used in conjunction with the evaluation in short as a synonym for the information on the detected user interaction or actuation, etc. A detected user interaction is therefore a short synonym for the information on the detected user interaction.

The evaluation apparatus 300 receives information on the user interactions detected both in a position-resolved and time-resolved manner, and determines a current involvement value based on this information. The current involvement value is a measure of how strongly the user is involved in operating the at least one operating apparatus. The greater the involvement in the operation, the lesser his attention to traffic events.

A functionality of the evaluation apparatus is generally realized by means of a program-controlled processor unit 310. In addition to the processor 310, the evaluation apparatus therefore comprises a memory 320 that comprises a program memory 321 and a working and parameter memory 325. The program memory 321 stores the program whose execution on the processor unit provides the functionality of the evaluation apparatus 300. The working and parameter memory 325 stores data that are relevant for the functionality. Part of the parameters can also be stored in the program memory 321. For example, the parameters that define threshold values, or their standard values for dynamically changing threshold values, can be stored in the program memory 321.

The evaluation apparatus 300 is designed to determine a current involvement value based on the user interactions that are detected by the at least one operating apparatus 200. The current involvement value is increased upon each detected user interaction. The current involvement value is lowered continuously over time or in intervals of time independent of whether or not a user interaction has occurred provided that the current involvement value has not reached its base value, generally the value zero.

Moreover, the evaluation apparatus 300 is designed to compare the current involvement value with an interruption threshold value. If this interruption threshold value is reached or exceeded, a blocking state occurs and blocks the evaluation apparatus 300, the operating apparatus 200, or at least restricts their operation. Further user entries are ignored as long as the at least one user apparatus 200 is blocked. If the at least one operating apparatus 200 is only restricted with respect to operation, user interactions are therefore ignored that relate to blocked functions and functionalities. This makes it possible to permit individual safety-relevant operations, for example to still make entries relevant to driving safety using the at least one operating apparatus 200.

For example, an output of content of the functions and/or functionalities to be operated via the at least one operating apparatus 200 is also blocked. This however does not affect the content relevant to driving safety such as, for example, the video display of the rear traffic area that is detected by a rear view camera 15.

To inform the user that a blocking state of the at least one operating apparatus 200 has occurred, the device 100 has an output apparatus 400. This can comprise different subsystems in order to configure the output in a multimodal manner. On the one hand, a display context, for example, is shown on the display apparatus 410 of the touchscreen 210 which prompts the driver to direct his attention to the traffic situation. In addition or alternatively, there can be acoustic output through an audio system 430 of the vehicle 1. It is also alternatively or additionally possible to haptically inform the user about the occurrence of the blocking state, for example via a haptic feedback unit 440 that is coupled to the touchscreen 210. Again alternatively or in addition, haptic feedback means can be used in a steering wheel 20.

Again alternatively or in addition, a lighting apparatus 420 can be used that, for example, is arranged in a peripheral field of view of the driver on an edge 6 of the windshield 4. The lighting apparatus 420 comprises for example a plurality of lighting means 421 that for example are designed as light emitting diodes. To forewarn the driver that another user entry via the at least one operating apparatus 200 can lead to a blocking state of this at least one operating apparatus 200, the evaluation apparatus 300 has a warning apparatus 390. In some embodiments, this is also integrated in the program code that provides the other functionality of the evaluation apparatus 300, and which is shown here as a separate unit solely for illustrative purposes. The warning apparatus 390 compares the current involvement value with one or more warning threshold values. If a warning threshold value is reached or exceeded, the warning is output to the user via the output apparatus 400. This can be done again visually, acoustically and/or haptically, and/or in any combination. For example, the lighting apparatus 420 can be switched on in the peripheral field of vision of the driver. If different warning thresholds are provided, light of a different color can be emitted, wherein the color is assigned to the corresponding warning threshold. For example, yellow light can be emitted when a first warning threshold is reached, and light of a different color, such as red light, can be emitted when a second warning threshold is reached, at which the current involvement value has a shorter distance from the interruption threshold value.

In some embodiments as shown in FIG. 1, the device is connected to a stress management system 700. Alternatively, this stress management system 700 can be partially or completely designed as a component of the evaluation apparatus 300. The stress management system 700 evaluates stress factors. For this purpose, the stress management system 700 monitors various assistance systems 720 such as a lane assist 721, an electronic stability control (ESP) 722, a navigation system 723, a cruise control system 724, and/or other assistance systems 725. Furthermore, the stress management system 700 is coupled to a driver monitoring system 730 that, for example, can comprise drowsiness detection and the like, and provides information about the driver. Moreover, the stress management system 700 is for example also connected to other vehicle control units 740 that supply information on the state of the vehicle 1 and/or the environment. By means of the information provided by the different systems and units, all of which are collectively referred here to as stress information, the stress management system 700 determines the stresses to which the driver is currently being exposed while driving the vehicle. From this, the level of the required attention by the driver to drive the vehicle can be determined. In some embodiments, the evaluation apparatus 300 is designed so that it dynamically adapts the interruption threshold value depending on the information from the stress management system 700. For this purpose, a strictness module 380 of the evaluation apparatus is provided in some embodiments. If, for example, a lane assist is active and has a high confidence value for the recognition of the lane and if, for example the speed is controlled by the cruise control system, the required attention of the driver is rated lower than in a situation in which the lane assistance system cannot recognize the lanes, and the speed is controlled by the driver. The interruption threshold value is correspondingly lowered when the stress management system 700 indicates that the attention required from the driver is less. If the required attention is contrastingly high, the interruption threshold value is also raised.

In order to achieve that the driver interrupts his operation of the at least one operating system and directs his attention to the driving process when the blocking state has occurred, the blocking state of the at least one operating apparatus 200 in embodiments is only ended and the operating apparatus 200 is released for new operations when the current involvement value has fallen below or to a release threshold value. The release threshold value can also be dynamically adapted depending on information from the stress management system 700. The adaptation can be such that the same time span is always needed to reduce the current involvement value by an amount that corresponds to the difference between the interruption threshold value and the release threshold value. Other embodiments can however provide that the interruption threshold value and the release threshold value are dynamically adapted such that the time span that is needed to lower the current involvement value to or below the release threshold value after the blocking state has been reached, is greater when greater attention by the driver is needed to drive the vehicle.

Embodiments are provided in which, in a normal operating state, an average interruption threshold value and an average release threshold value are used that are each lowered when particularly heightened attention is needed, and are accordingly raised when only reduced attention by the driver is required to drive the vehicle.

In addition, the current involvement value in some embodiments is influenced by a state machine 1300 and an additional state machine 1400 that are implemented in the evaluation apparatus. Their mode of operation is explained in greater detail below in conjunction with FIG. 7.

In addition to the at least one operating apparatus 200 that, in the depicted example, also comprises a display apparatus 211 of the touchscreen 210, other display units such as a passenger display unit 500 in front of the passenger and/or a display of the instrument cluster 600 can be controlled by the evaluation apparatus 300, and display content can be blocked in the blocking state provided that the driver can perceive content on the corresponding display units. If the passenger display unit 500 is only perceptible by the passenger, blocking of display contexts on the passenger display unit 500 generally does not occur.

Figure 2:
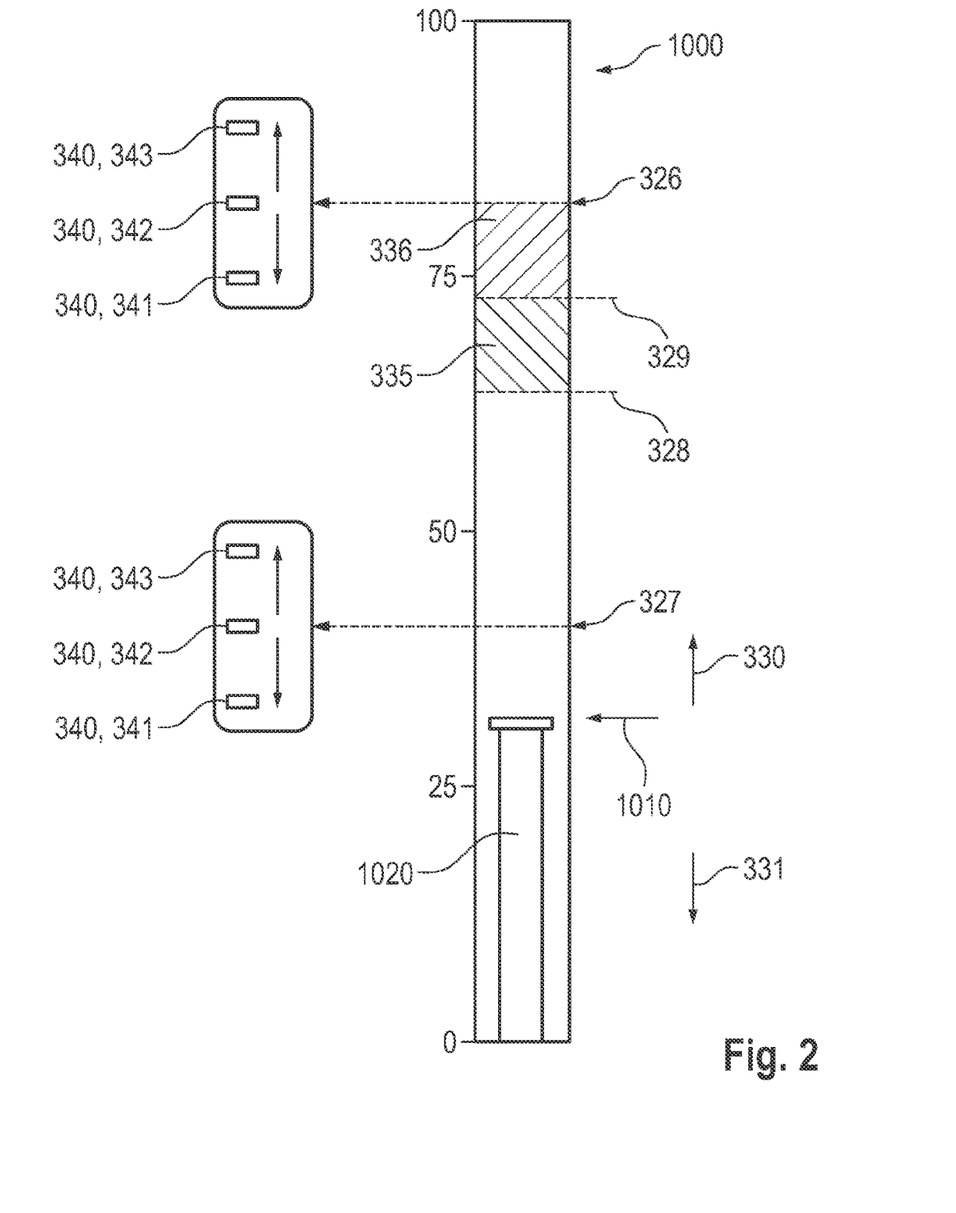
FIG. 2 shows a schematic representation of an example block diagram to illustrate the current involvement value.

FIG. 2 schematically shows a bar chart in which the current involvement value 1010 is shown by means of a bar 1020. Furthermore, the different threshold values are shown. These comprise a warning threshold value 328 and, in these embodiments, an additional warning threshold value 329, the interruption threshold value 326, as well as the release threshold value 327. A warning area 335 above the one warning threshold value 328 and an additional warning area 336 above the additional warning threshold value 329 are shaded to indicate that a driver is being informed, for example by colored light, of a pending blocking state in the event of further user interaction. The different shading indicates different colors.

An upward arrow 330 indicates that the current involvement value is increased by either a distance actuation value or a local actuation value and, if necessary, additionally by a continuous actuation value. In addition, one or more state machines can increase the current actuation value.

A downward arrow 331 indicates that the current actuation value is continuously being lowered over time in competition and in addition to this.

Beyond the interruption threshold value 326 and the release threshold value 327, three stress states 340 are schematically shown which are determined for the driver and the driving situation. In the event of a low stress state 341, the interruption threshold value 326 and release threshold value 327 are reduced in comparison to the corresponding values in the event of a normal or average stress state 342. In the event of a high stress state 343, the interruption threshold value 326 and release threshold value 327 are raised in comparison to the corresponding values in the event of a normal or average stress state 342.

Figure 4:
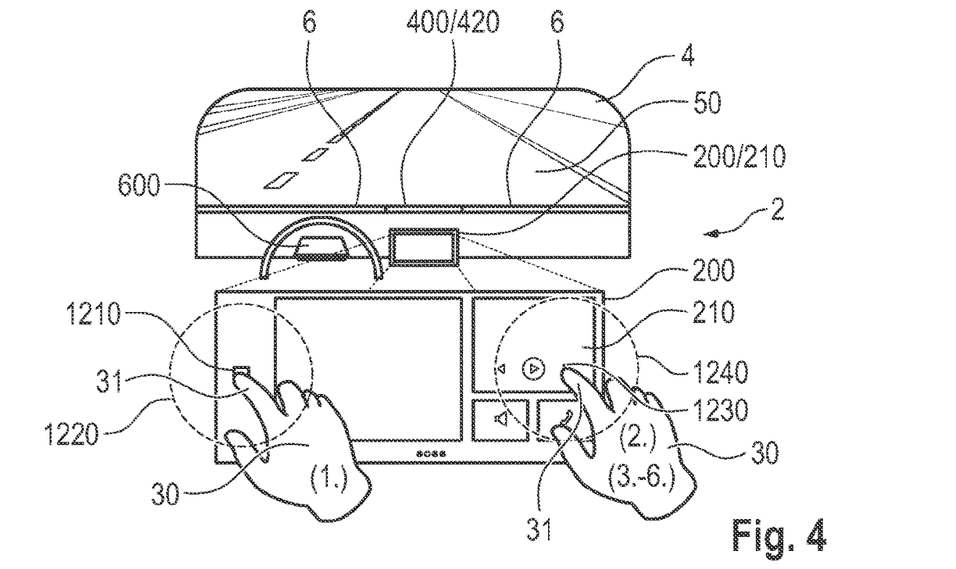
FIG. 4 shows a schematic interior view of an example vehicle cockpit with an enlarged operating apparatus in an unblocked state.

FIG. 4 is for schematically clarifying how the current involvement value is determined and changed. FIG. 4 schematically shows the interior view of a vehicle cockpit 2 from the perspective of the driver. The steering wheel 20, at least one operating apparatus 200 designed as a touchscreen 210, an instrument cluster display 600, a lower edge 6 of the windshield 4, and a road 50 visible through the windshield 4 can be seen. The lighting apparatus 420 of the output apparatus 400 can be seen on the lower edge 6 of the windshield 4. The touchscreen 210 of the at least one operating apparatus 200 is shown enlarged in the foreground. With an actuation element designed as a finger 31, a user makes a user entry for example at a first touch position 1210. This increases the current involvement value by a constant distance actuation value. This is because no actuation has been made beforehand within a local actuation time period, which is, for example, a few 100 milliseconds, or 1 second in some embodiments, within a proximity 1220 around the first touch position 1210. Subsequently, the user undertakes a second actuation at the second touch position 1230. Since this is not done within the proximity 1220 of the previously executed first actuation at the first actuation position 1210, the current involvement value is again increased by the constant distance actuation value.

Subsequently, in the shown example, the user executes a third to sixth actuation within the proximity 1240 of the second touch position 1230 each with a time difference that is less than the proximity span, which is, for example, a few 100 milliseconds. For the third to sixth user interaction, the current involvement value is always increased by just the local actuation value which is less than the distance actuation value.

In addition, it is checked whether an actuation duration of the user interaction has reached or exceeded a brief actuation time span. In this case, the current involvement value is additionally increased by an actuation duration involvement value. The actuation duration involvement value is for example variable. If the actuation lasts longer than the brief actuation time span and is shorter than the maximum actuation time span, the actuation duration involvement value is for example equal to the product of an actuation duration weighting value and a difference between the actuation duration and brief actuation time span or, stated more precisely, is equal to the value indicating the duration of the brief actuation time span. If the actuation lasts longer than the maximum actuation time span, the actuation duration involvement value is set to an actuation duration involvement maximum value. This for example corresponds to the product from the actuation duration weighting value and the time difference between the lengths of the maximum actuation time span and the brief actuation time span. For example, the actuation duration involvement value is therefore either equal to a product of the actuation duration weighting value and a difference between the actuation duration and the brief actuation time span or, if this difference is greater than an actuation duration involvement maximum value, is equal to a product of the actuation duration weighting value and this actuation duration involvement maximum value.

In the shown embodiments, it is for example assumed that when the sixth user interaction is executed, the current involvement value exceeds a first warning threshold value. The lighting apparatus 420 then emits yellow light in the peripheral field of view of the driver at the bottom edge 6 of the windshield 4. In addition or alternatively, haptic feedback can be provided by the touchscreen 210 and/or audio output by an audio system (not shown). The emitted light, audio output, and/or haptic feedback warn the driver of the possible occurrence of a blocking state in which additional user interactions with the at least one operating apparatus 200 are no longer possible and are ignored for a time period until the current involvement value has again reached or fallen below a release threshold value. This occurs due to a time-continuous or time-stepped decrease of the current involvement value by a constant amount per unit time until the current involvement value has reached a minimum base value, such as zero.

Figure 5:
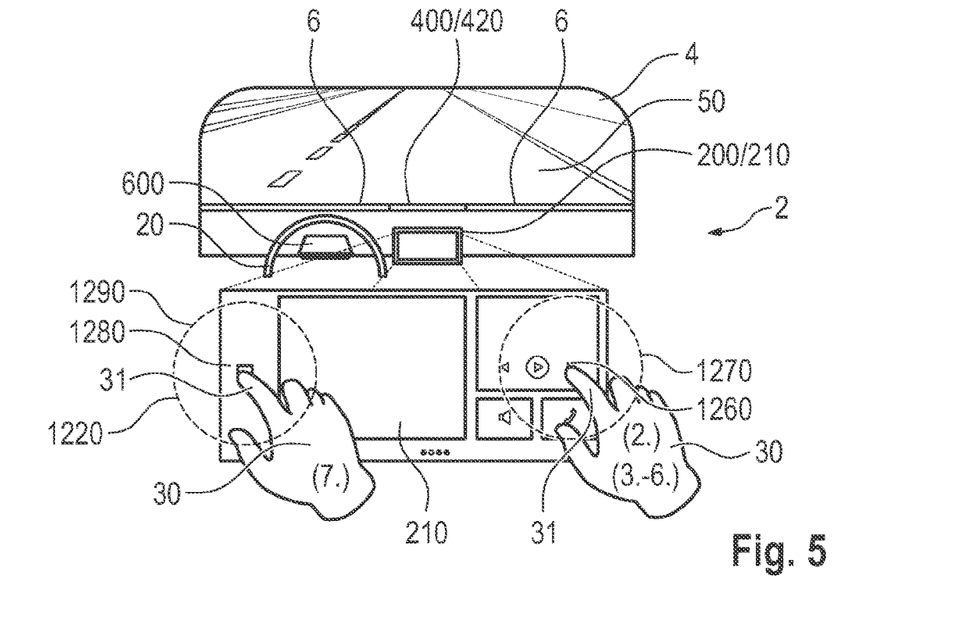
FIG. 5 shows a schematic interior view of an example cockpit with an operating apparatus in a warning state.

This warning state is for example schematically shown in FIG. 5. The same technical features are identified with the same reference signs in all the figures. A seventh actuation whose time interval exceeds the brief actuation time span and whose actuation start position 1280 is at a distance from the previous actuation start position 1260 of the sixth user interaction by more than its proximity threshold value again increases the current involvement value by the constant distance actuation value. The proximities 1270 and 1290 are also shown. The user interaction lasts for a time span that is greater than the brief actuation time span. For this reason, the current involvement value is increased by an actuation duration involvement value which, as described above, is calculated.

For example, the additional warning threshold value is thereby exceeded so that a color of the light emitted by the lighting apparatus 420 of the output apparatus 400 is changed; red light, for example, is then emitted. The driver is thereby notified in his peripheral field of vision that a blocking state is imminent if there is further user interaction using the at least one operating apparatus 200.

If the user engages in further user interaction before the current involvement value has fallen sufficiently from the reduction occurring over time, the interruption threshold value is reached or exceeded with the new user interaction by the current involvement value, and the at least one operating apparatus 200 switches to a blocking state.

Figure 6:
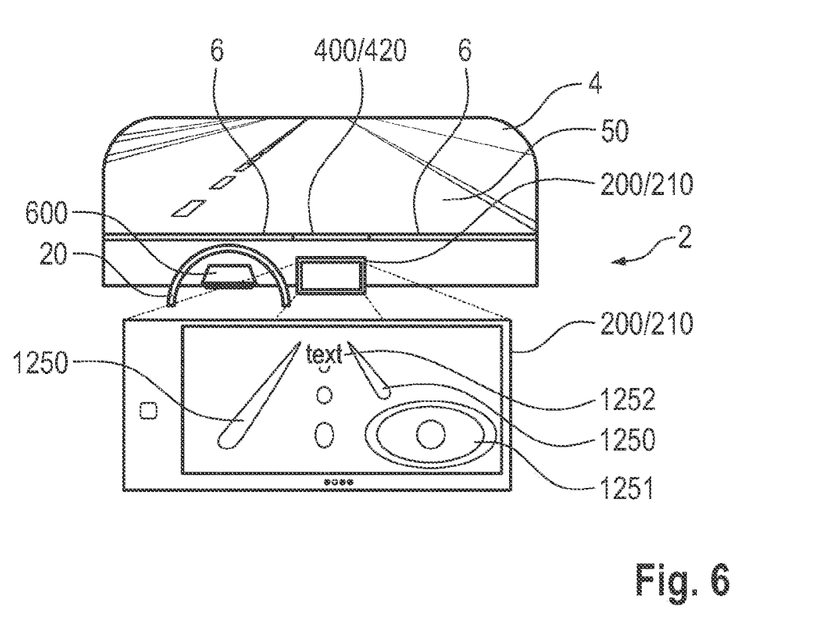
FIG. 6 shows a schematic representation of an example cockpit interior view in which the operating apparatus is in a blocking state.

This is shown by way of example in FIG. 6. On the display apparatus 211 of the touchscreen 210, the driver is prompted to turn his attention to the road 50 by graphic symbols such as, for example, a stylized lane 1250 and a stylized eye 1251, and additionally for example by a text 1252.

In the blocking state, additional user interactions are ignored. Other embodiments can provide that certain individual user entries are still detected that are needed for safety-relevant functionalities. In any case, operation with respect to certain functions and functionalities is restricted, however. Generally, the display of information is also blocked at a minimum on the at least one operating apparatus 200, and possibly on other displays such as for example information elements in the instrument cluster display 600 or other displays (not shown) contained in the vehicle cockpit 2.

Figure 3:
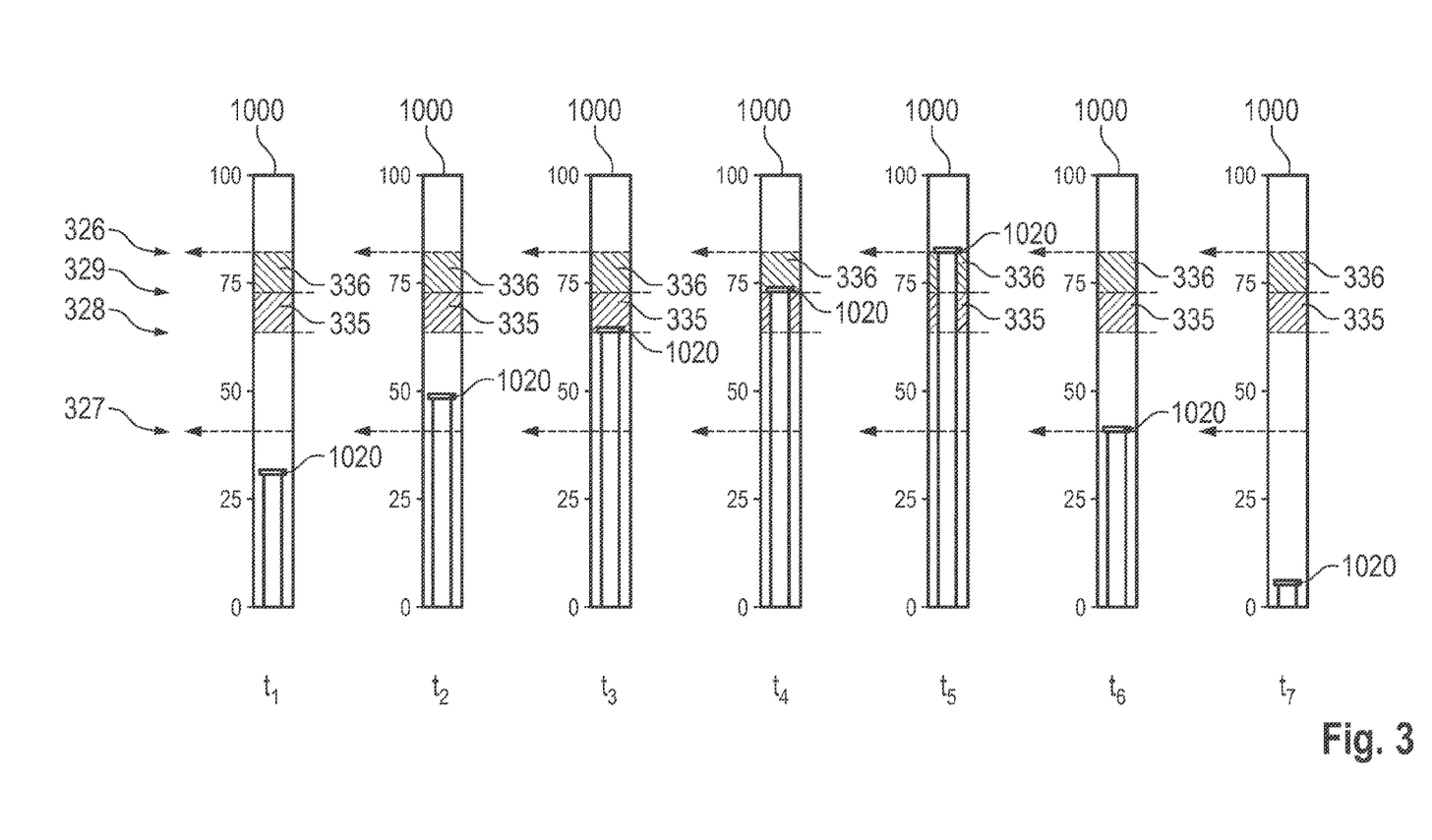
FIG. 3 shows a plurality of example bar charts to visualize the current involvement value at different points in time during the user interaction.

FIG. 3 shows a temporal sequence of different bar charts 1000 that correspond to several successive points in time that are identified with tx, wherein x is a natural number. Not every point in time must correspond with a user interaction. The time intervals between the different points in time also do not have to be the same. The same technical features are again identified the same and will not again be explained.

While the user actions are being executed, the current involvement value 1010 first rises at t1, t2. At point in time t3, a warning threshold value 238 is reached by the current involvement value 1010. This is output to the user by the output apparatus, for example by changing the color of virtual control elements on the display area of the one operating apparatus 200, or by emitting colored light in the peripheral field of view of the driver, or also acoustically by the output of a signal, or by haptic feedback on the part of the at least one operating apparatus 200 designed as a touchscreen.

The current involvement value 1010 is increased further by a further user interaction, and an additional warning threshold 329 is exceeded t4. In this case as well, a warning is again output by the output apparatus, for example in that the emitted light changes its color, and/or virtual control elements are shown changed, an acoustic signal is output, and/or haptic feedback is provided.

At point in time t5, the interruption threshold value 326 is reached or exceeded due to a further user interaction by the current involvement value 1010, and a blocking state is triggered. This continues until, based on elapsed time, the continuous lowering of the current involvement value 1010 that occurs with and without user interaction has lowered the current involvement value 1010 back to or below the release threshold value 327 (t6). Without user interaction, the current involvement value 1010 decreases further (t7).

In some embodiments, an interaction sequence of the user interactions is monitored by means of one or more state machines. This is intended to prevent user interactions in which the user attempts, either by very quick successive user interactions or by intentional, slow but continuous user interactions, to perform very complex functional operations that nevertheless require the attention of the driver, or to perform several functions immediately one after another in time, in particular without taking sufficient breaks.

Figure 7:
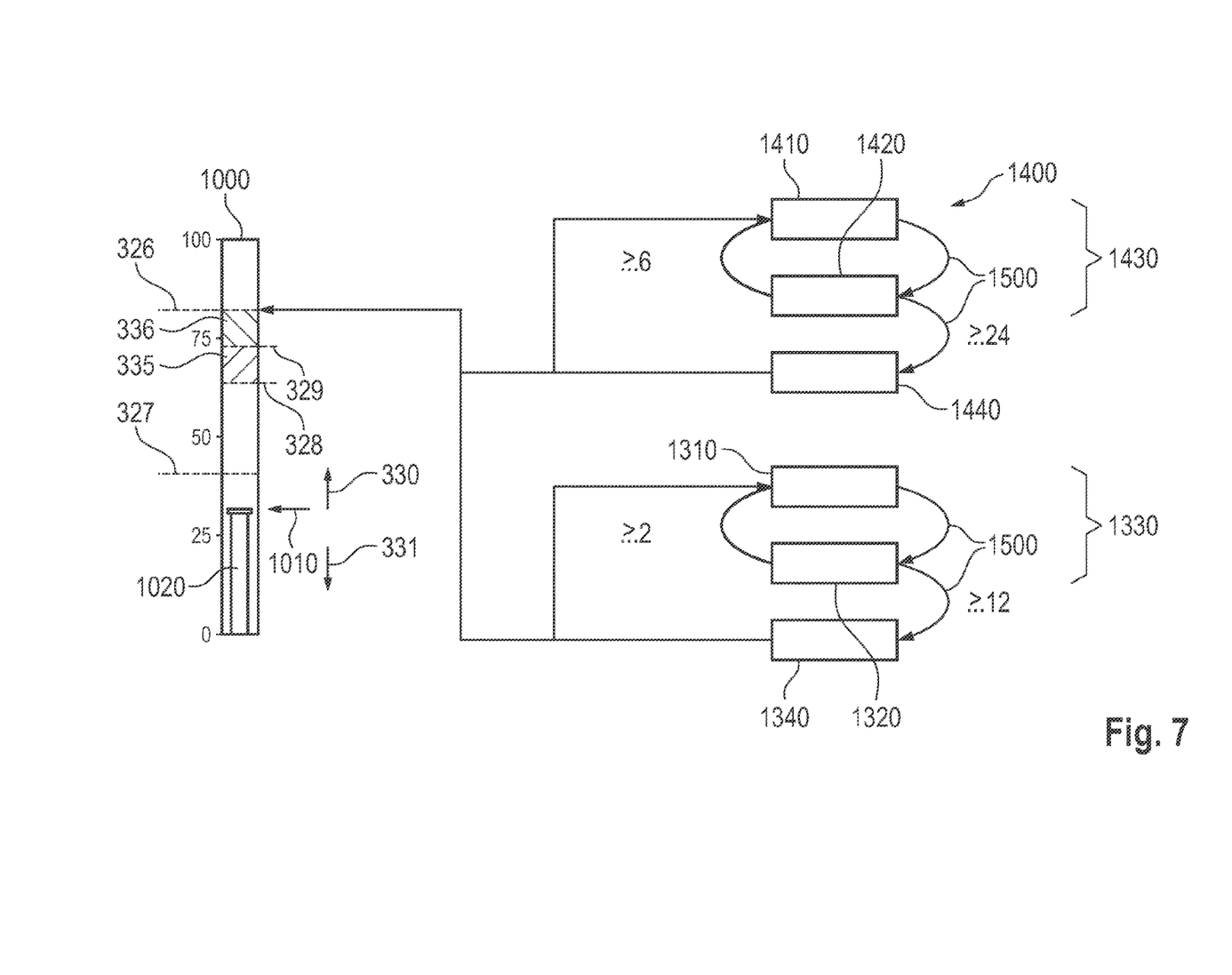
FIG. 7 shows a schematic representation of an example mode of operation of two state machines in determining the current involvement value.

FIG. 7 schematically shows the modes of operation of a first state machine 1300 which monitors a particularly fast operation of complex functionalities, and an additional state machine 1400 which monitors a slow but continuous operation of complex functionalities, next to a bar chart 1000 which is similar to that shown in FIG. 2. The state machines 1300, 1400 each monitor whether the temporally sequential user interactions comprise a group of user interactions in which the temporally sequential user actions are made with time intervals that are shorter than a particular interaction interval time span which is assigned to the corresponding state machine. In addition, an interaction monitoring time span is assigned to the particular state machine. The particular state machine 1300, 1400 checks whether a group of user interactions whose time intervals are each shorter than the interaction interval time span jointly span a time period that is greater than or equal to the interaction monitoring time span. If this is the case, the corresponding state machine switches to an increased involvement state. This causes the evaluation apparatus to raise the current involvement value to or above the interruption threshold value. In the shown embodiments, the interaction monitoring time span of the one state machine 1300 is for example 12 seconds, and the assigned interaction interval time span is 2 seconds. If actuations are made within 12 seconds whose time intervals from each other never reach or exceed 2 seconds (or alternatively never exceed 2 seconds), the state machine 1300 changes to the increased involvement state and results in a blocking state of the operating apparatus.

The state machine 1300 is therefore initially in an internal unoperated state 1310. If there is a user interaction, a switch occurs to an internal actuation state 1320. To the outside, the state of the state machine is a normal involvement state 1330. If another actuation occurs within the assigned interaction interval time span (such as 2 seconds), the state machine remains in the internal actuation state 1320. If there is a pause between the user interactions that is equal to or greater than the interaction interval time span, there is a switch to the internal unoperated state 1310. If the state machine remains in the internal actuation state 1320 for a time span equal to or greater than the interaction monitoring time span (such as 12 seconds) (alternatively, greater than the interaction monitoring time span), the state machine changes to the elevated involvement state 1340 which is an externally detectable state of the state machine 1300. This elevated involvement state 1340 causes the current involvement value 1010 to be increased to or above the interruption threshold value 326. Then the state machine is reset to the normal involvement state 1330 with the internal unoperated state 1310.

The additional state machine 1400 is, for example, assigned another interaction monitoring time span of 24 seconds and another interaction interval time span of 6 seconds. If actuations therefore occur for 24 seconds or more seconds between which more than 6 seconds never elapse (or alternatively 6 seconds or more never elapse), this additional state machine 1400 changes to the increased involvement state and also causes the current involvement value 1010 to be raised to the interruption threshold value 326, and a blocking state is thereby triggered.

The additional state machine 1400 is therefore initially in an internal unoperated state 1410. If there is a user interaction 1500, a switch occurs to an internal actuation state 1420. To the outside, the state of the state machine is a normal involvement state 1430. If another actuation occurs within the assigned interaction interval time span, the state machine remains in the internal actuation state 1420. If there is a pause between the user interactions 1500 that is equal to or greater than the interaction interval time span (such as greater than 6 seconds), there is a switch to the internal unoperated state 1410. If the state machine remains in the internal actuation state 1420 for a time span equal to or greater than the interaction monitoring time span (such as 24 seconds) (alternatively, greater than the interaction monitoring time span), the state machine changes to the elevated involvement state 1440 which is an externally detectable state of the state machine 1400. This elevated involvement state 1440 causes the current involvement value 1010 to be increased to or above the interruption threshold value 326. Then the state machine is reset to the normal involvement state 1430 with the internal unoperated state 1410.

Figure 8:
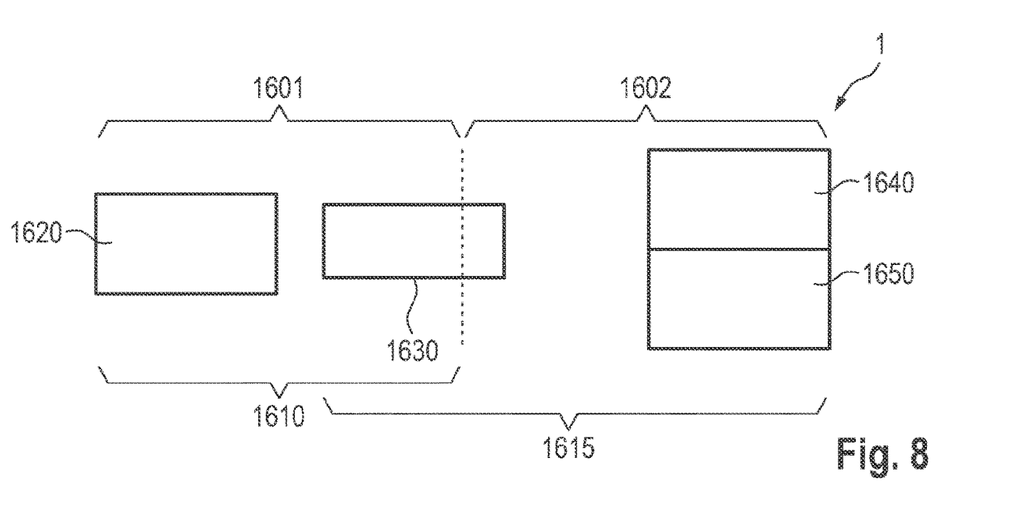
FIG. 8 shows a schematic representation of an example front region of a vehicle with a plurality of display and/or operating apparatuses.

FIG. 8 schematically shows a front region 1600 of a vehicle 1. The front region 1600 has a driver's side 1601 and a passenger's side 1602. In in actuation region 1610 of the driver, there is a display and operating apparatus 1620 and another display and operating apparatus 1630, for example two touchscreens, by means of which the driver can make user entries. At least the one additional display and operating apparatus 1630 is also in another actuation region 1615 of the passenger. Moreover in the front region 1600 of the vehicle 1, there is another display apparatus 1640 whose content is perceptible both by the driver and passenger, as well as a further additional display apparatus 1650 whose content is only perceptible by the passenger. Whereas actuations on the two display and control apparatuses 1620, 1630 cause the current involvement value to be accordingly increased independent of whether the user interaction is performed by the driver or the passenger, and the operation and, if applicable, the display of information on the two display apparatuses is correspondingly blocked, as soon as the interruption threshold value is reached or exceeded by the current involvement value, the displayed content is statically blocked on the additional display apparatus 1640 which is visible to both the driver and the passenger, but the driver cannot use it to make any user entries, i.e., depending on the driving situation, the display of certain content is prevented, such as for example the display of moving image sequences while the vehicle is moving. The additional display apparatus 1650 whose content can only be perceived by the passenger is contrastingly not at all influenced by the blocking state or blocking measures.

It is understood by a person skilled in the art that only example embodiments are described herein. Example embodiments are conceivable that do not have any state machine, only one state machine, or more than two state machines. These are, however, always provided in addition to the increases in the current involvement value caused by each user interaction with the at least one operating apparatus for its further additional influence.

LIST OF REFERENCE NUMERALS

1 Vehicle
2 Vehicle cockpit
4 Windshield
5 Center console
6 Edge
10 Driver's seat
11 Passenger's seat
15 Rear view camera
20 Steering wheel
30 Actuation element
31 Finger
50 Road
100 Device for blocking at least one operating apparatus
200 Operating apparatus
210 Touchscreen
211 Display
212 Position detection unit
300 Evaluation apparatus
310 Processor
320 Memory
321 Program memory
325 Parameter memory
326 Interruption threshold value
327 Release threshold value
328 Warning threshold value
329 Additional warning threshold value
330 Upward arrow
331 Downward arrow
335 Warning area
336 Additional warning area
340 Stress state
341 Low stress state
342 Medium/normal stress state
343 High stress state
380 Strictness module
390 Warning apparatus
400 Output apparatus
411 Display apparatus
420 Lighting apparatus
421 Lighting means
430 Audio system
440 Haptic feedback unit
500 Passenger display
600 Instrument cluster display
700 Stress management system
720 Assistance systems
721 Lane assist
722 Electronic stability control (ESP)
723 Navigation system
724 Cruise control system
725 Additional assistance systems
730 Driver state monitoring system
740 Other vehicle control units
1000 Bar chart
1010 Current involvement value
1020 Bar
1210 First touch position
1220 Proximity (first touch position)
1230 Second touch position
1240 Proximity (second touch position)
1250 Stylized lane
1251 Stylized eye
1252 Text
1260 Previous actuation start position (sixth user interaction)
1270 Proximity (sixth user interaction)
1280 Actuation start position (seventh actuation)
1290 Proximity (seventh actuation)
1300 State machine
1310 Unoperated state
1320 Internal actuation state
1330 Normal involvement state
1340 Increased involvement state
1400 Additional state machine
1410 Unoperated state
1420 Internal actuation state
1430 Normal involvement state
1440 Increased involvement state
1500 User interaction
1600 Front region
1601 Driver's side
1602 Passenger's side
1610 Actuation region
1615 Additional actuation region
1620 Display and operation apparatus
1630 Additional display and operation apparatus
1640 Additional display apparatus
1650 Additional further display apparatus
t1-t7 Points in time The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A device for a vehicle for blocking display and/or operating contexts comprising:
at least one operating apparatus for detecting haptic user interactions; and
an evaluation apparatus, configured to determine a current involvement value at least on the basis of the detected user interactions;
wherein
the evaluation apparatus is configured to compare the current involvement value with at least one interruption threshold value, and to establish a blocking state if the current involvement value reaches the at least one interruption threshold value, and the evaluation apparatus blocks or at least restricts at least one operating context of the at least one operating apparatus; wherein
the current involvement value is increased for each detected haptic user interaction, insofar as the current involvement value has not reached or exceeded the at least one interruption threshold value, wherein the evaluation apparatus is configured to lower, continuously or in increments of time, the current involvement value by a recovery value;
the at least one operating apparatus is configured to detect the user interaction resolved for position and time, and the evaluation apparatus is configured to increase the current involvement value depending on the spatial distance between positions and a time interval of sequential actuation starts, and wherein
the evaluation apparatus is configured to increase the current involvement value upon each detection of an actuation start by a constant distance actuation value when the spatial distance of the position at which the actuation start of the user interaction is detected from the position at which the actuation start of the temporally preceding detected user interaction is detected reaches or exceeds a proximity threshold value, or when a time span between the detection of the actuation start and the detection of an actuation start directly preceding in time reaches or exceeds a local actuation time span, and to increase the current involvement value by a constant local actuation value upon each detected actuation start, when the spatial distance of the position at which the actuation start of the user interaction is detected from the position at which the actuation start of the temporally preceding detected user interaction is detected falls below a proximity threshold value, and in addition, a time span between the detection of the actuation start and the detection of the temporally preceding actuation start falls below a local actuation time span, wherein the local actuation value is a smaller amount than the distance actuation value.

2. The device of claim 1, wherein the evaluation apparatus is configured to increase the current involvement value by an actuation duration involvement value upon detecting an actuation end of a user interaction when an actuation duration of the user interaction has reached or exceeded a brief actuation threshold value.

3. The device of claim 2, wherein the actuation duration involvement value is variable and is a minimum of a difference between the actuation duration and the brief actuation time span and an actuation duration involvement maximum value.

4. The device of claim 1, wherein the evaluation apparatus is configured to end the blocking state when the current involvement value falls below a release threshold value.

5. The device of claim 1, wherein the evaluation apparatus has at least one state machine, evaluates an interaction sequence of the user interactions, and is configured to recognize an increased involvement state or a normal involvement state based on the evaluation of the user interaction sequence, wherein the evaluation apparatus is configured to set the current involvement value to the interruption threshold value when the increased involvement state is recognized.

6. The device of claim 5, wherein the at least one state machine is assigned an interaction monitoring time span and an interaction interval time span, and changes to the increased involvement state upon detection of a user interaction sequence that comprises a group of actuation starts detected sequentially over time, in which the time intervals between the actuation starts of the group detected in direct sequence are all shorter than or equal to the interaction interval time span, and at the same time these actuation starts of the group in the user interaction sequence span a time period which is greater than or equal to the interaction monitoring time span.

7. The device of claim 6, wherein, in addition to the at least one state machine, the evaluation apparatus comprises at least one additional state machine which evaluates the user interaction sequence and which is configured to also detect an increased interaction involvement state or a normal involvement state, and the evaluation apparatus sets the current involvement value to the interruption threshold value when the at least one additional state machine changes to the increased involvement state, wherein the at least one additional state machine is assigned an additional interaction monitoring time period and an additional interaction interval time span, and changes to the increased involvement state upon detection of a user interaction sequence that comprises a group of actuation starts detected sequentially over time, in which the time intervals between the actuation starts of the additional group detected in direct sequence are all shorter than (or equal to) the additional interaction interval time span, and at the same time these actuation starts of the additional group in the user interaction sequence span a time period which is greater than or equal to the additional interaction monitoring time span.

8. The device of claim 1, wherein the evaluation apparatus is configured to receive stress information and dynamically adapt the interruption threshold value based on the stress information.

9. The device of claim 8, wherein the evaluation apparatus is configured to dynamically adapt the release threshold value depending on the stress information.

10. The device of claim 1, wherein the evaluation apparatus is configured to be coupled to at least one output apparatus in order to output blocking information about the existing blocking state that is perceptible without removing one's gaze from the road traffic.

11. The device of claim 10, wherein the output apparatus comprises a lighting apparatus (with a plurality of lighting devices, wherein the plurality of lighting devices is arranged on the edge of a windshield in the peripheral field of vision of the driver.

12. The device of claim 10, wherein the evaluation apparatus comprises a warning apparatus which outputs a warning about a pending blocking state via the at least one output apparatus, and/or the operating apparatus, and/or a display apparatus if the current involvement value falls below or reaches at least one warning threshold value.

13. A method for blocking display and/or operating contexts in a vehicle comprising:
   detecting haptic user interactions using at least one operating apparatus; and
   determining a current involvement value using at least the detected user interactions;
   wherein
   the current involvement value is compared with at least one interruption threshold value, and a blocking state is established if the current involvement value has reached or exceeded the at least one interruption threshold value, and at least one operating context of the at least one operating apparatus is blocked or at least restricted from further operation, wherein
   the current involvement value is increased for each detected haptic user interaction, insofar as the current involvement value has not reached or exceeded the at least one interruption threshold value, and the current involvement value is lowered continuously or in increments of time by a recovery value;
   the at least one operating apparatus is configured to detect the user interaction resolved for position and time, and the evaluation apparatus is configured to increase the current involvement value depending on the spatial distance between positions and a time interval of sequential actuation starts, and wherein
   the evaluation apparatus is configured to increase the current involvement value upon each detection of an actuation start by a constant distance actuation value when the spatial distance of the position at which the actuation start of the user interaction is detected from the position at which the actuation start of the temporally preceding detected user interaction is detected reaches or exceeds a proximity threshold value, or when a time span between the detection of the actuation start and the detection of an actuation start directly preceding in time reaches or exceeds a local actuation time span, and to increase the current involvement value by a constant local actuation value upon each detected actuation start, when the spatial distance of the position at which the actuation start of the user interaction is detected from the position at which the actuation start of the temporally preceding detected user interaction is detected falls below a proximity threshold value, and in addition, a time span between the detection of the actuation start and the detection of the temporally preceding actuation start falls below a local actuation time span, wherein the local actuation value is a smaller amount than the distance actuation value.

14. A device for a vehicle for blocking display and/or operating contexts comprising:
   at least one operating apparatus for detecting haptic user interactions; and
   an evaluation apparatus, configured to determine a current involvement value at least on the basis of the detected user interactions;
   wherein
   the evaluation apparatus is configured to compare the current involvement value with at least one interruption threshold value, and to establish a blocking state if the current involvement value reaches the at least one interruption threshold value, and the evaluation apparatus blocks or at least restricts at least one operating context of the at least one operating apparatus; wherein
   the current involvement value is increased for each detected haptic user interaction, insofar as the current involvement value has not reached or exceeded the at least one interruption threshold value, wherein the evaluation apparatus is configured to lower, continuously or in increments of time, the current involvement value by a recovery value; and wherein
   the evaluation apparatus is configured to be coupled to at least one output apparatus in order to output blocking information about the existing blocking state that is perceptible without removing one's gaze from the road traffic.

15. A method for blocking display and/or operating contexts in a vehicle comprising:
   detecting haptic user interactions using at least one operating apparatus; and
   determining a current involvement value using at least the detected user interactions;
   wherein
   the current involvement value is compared with at least one interruption threshold value, and a blocking state is established if the current involvement value has reached or exceeded the at least one interruption threshold value, and at least one operating context of the at least one operating apparatus is blocked or at least restricted from further operation; wherein
   the current involvement value is increased for each detected haptic user interaction, insofar as the current involvement value has not reached or exceeded the at least one interruption threshold value, and the current involvement value is lowered continuously or in increments of time by a recovery value; and wherein
   the evaluation apparatus is configured to be coupled to at least one output apparatus in order to output blocking information about the existing blocking state that is perceptible without removing one's gaze from the road traffic.

* * * * *